(12) United States Patent
Camahort

(10) Patent No.: US 6,549,308 B1
(45) Date of Patent: Apr. 15, 2003

(54) UNIBIASED LIGHT FIELD MODELS FOR RENDERING AND HOLOGRAPHY

(75) Inventor: Emilio Camahort, Austin, TX (US)

(73) Assignee: Zebra Imaging, Inc., Pflugerville, TX (US)

(*) Notice: Subject to any disclaimer, the term of this patent is extended or adjusted under 35 U.S.C. 154(b) by 0 days.

(21) Appl. No.: 09/760,097

(22) Filed: Jan. 11, 2001

Related U.S. Application Data

(60) Provisional application No. 60/175,475, filed on Jan. 11, 2000.

(51) Int. Cl.$^7$ ................................................. G03H 1/08
(52) U.S. Cl. ........................................... 359/9; 345/419
(58) Field of Search ........................... 359/9, 1, 25, 35; 345/419, 426, 427; 382/154

(56) References Cited

U.S. PATENT DOCUMENTS

| | | | |
|---|---|---|---|
| 5,237,433 A | * | 8/1993 | Haines et al. ................. 359/26 |
| 6,097,394 A | * | 8/2000 | Levoy et al. ................. 345/419 |
| 6,108,440 A | * | 8/2000 | Baba et al. ................. 382/154 |

OTHER PUBLICATIONS

E. Camahort, D. Fussell, "A Geometric Study of Light Field Representations", Technical Report TR–99–35, Department of Computer Sciences, The University of Texas at Austin, Austin, Texas 78712, Dec., 1999.*

Marc Levoy and Pat Hanrahin, "Light Field Rendering," in *Proceedings of Siggraph '96*, (New Orleans, LA), Aug. 4–9, 1996., pp. 31–42.

William W. Halle and Adam B. Kropp, "Fast Computer Graphics Rendering For Full Parallax Spatial Displays," *Practical Holography* XI, Proc. SPIE, vol. 3011, Feb. 10–11, 1997, pp. 105–112.

Michael Halle, "Multiple Viewpoint Rendering," in *Proceedings of Siggraph '98*, (Orlando, FL), Jul. 19–24, 1996., pp. 243–254.

Emilio Camahort and Donald Fussell, "A Geometric Study of Light Field Representations," Dept. of Computer Science, The University of Texas at Austin, Jan. 7, 2001, pp. 1–17.

* cited by examiner

*Primary Examiner*—Audrey Chang
*Assistant Examiner*—Arnel C. Lavarias
(74) *Attorney, Agent, or Firm*—Campbell Stephenson Acolese LLP; Marc R. Ascolese

(57) ABSTRACT

An isotropic, direction and point parameterization (DPP) light-field model is used for rendering graphics images in a hologram production system. Using the DPP light-field models can reduce image artifacts, reduce oversampling, decrease rendering time, and decrease data storage requirements.

11 Claims, 2 Drawing Sheets

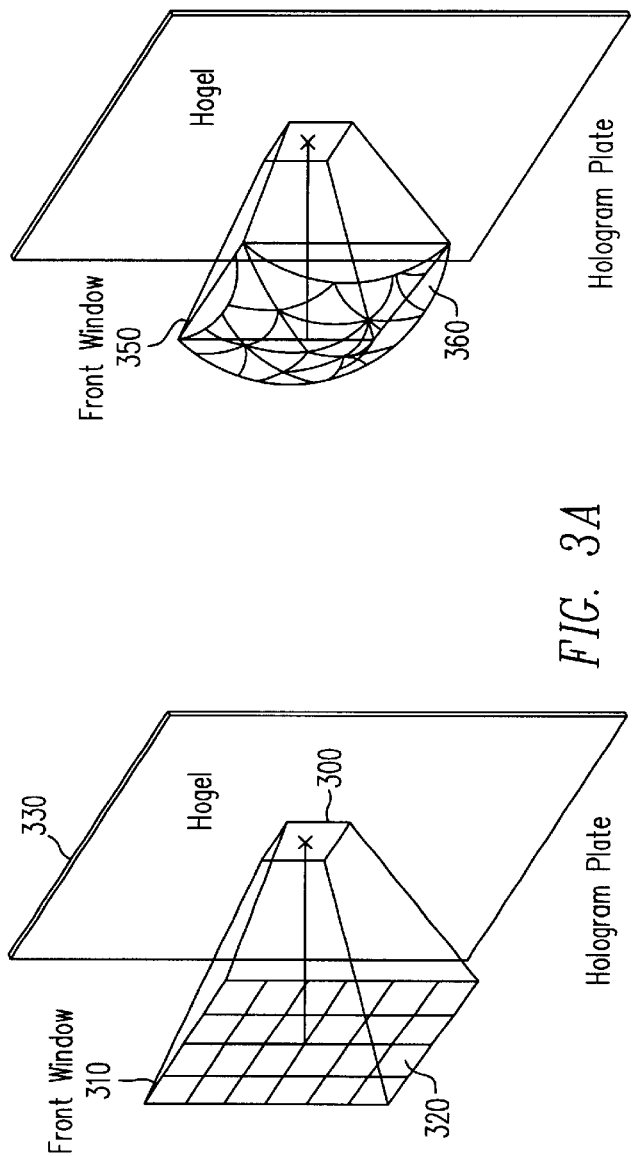
FIG. 3A
FIG. 3B
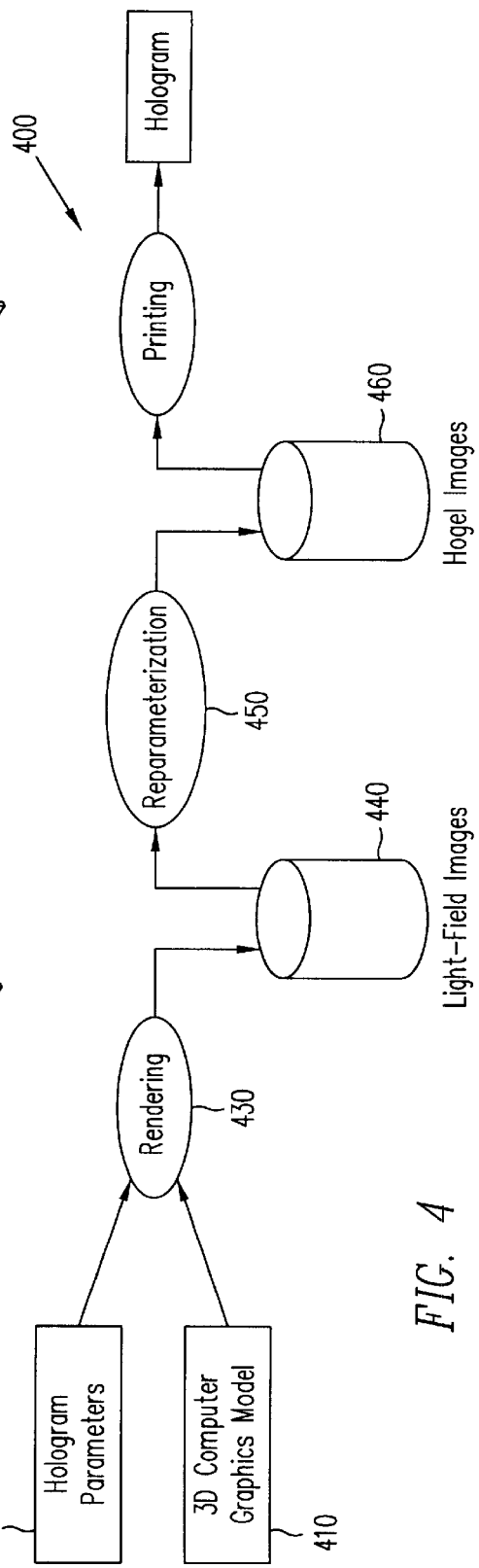
FIG. 4

UNIBIASED LIGHT FIELD MODELS FOR RENDERING AND HOLOGRAPHY

This application claims the benefit, under 35 U.S.C. §19 (e), of U.S. Provisional Application Ser. No. 60/175,475, filed Jan. 11, 2000, entitled "Unbiased Light Field Models For Rendering And Holography," and naming Emilio Camahort as the inventor. The above-referenced provisional application is hereby incorporated by reference herein in its entirety.

FIELD OF THE INVENTION

The present invention relates in general to the field of hologram production and, more particularly, hologram production using light field rendering techniques.

BACKGROUND OF THE INVENTION

Traditionally, the input to a three dimensional (3D) graphics system is a scene comprising geometric primitives composed of different materials and virtually illuminated by one or more light sources. Based on this input specification, a computer graphics rendering system computes and outputs an image. In recent years, a new approach to computer graphics rendering has emerged, namely imaged-based rendering. Image-based rendering systems typically generate different views of an environment from a set of pre-acquired imagery.

The development of image-based rendering techniques generally, and the application of those techniques to the field of holography have inspired the development of light field rendering as described by, for example, M. Levoy and P. Hanrahan in "Light Field Rendering," in *Proceedings of SIGGRAPH '96*, (New Orleans, La., Aug. 4–9, 1996), and in *Computer Graphics Proceedings, Annual Conference Series*, pages 31–42, ACM SIGGRAPH, 1996, which are hereby incorporated by reference herein in their entirety. The light field represents the amount of light passing through all points in 3D space along all possible directions. It can be represented by a high-dimensional function giving radiance as a function of time, wavelength, position and direction. The light field is relevant to image-based models because images are two-dimensional projections of the light field. Images can then be viewed as "slices" cut through the light field. Additionally, one can construct higher-dimensional computer-base models of the light field using images. A given model can also be used to extract and synthesize new images different from those used to build the model.

Formally, the light field represents the radiance flowing through all the points in a scene in all possible directions. For a given wavelength, one can represent a static light field as a five-dimensional (5D) scalar function $L(x, y, z, \theta, \phi)$ that gives radiance as a function of location (x, y, z) in 3D space and the direction $(\theta, \phi)$ the light is traveling. Note that this definition is equivalent to the definition of plenoptic function. Typical discrete (i.e., those implemented in real computer systems) light-field models represent radiance as a red, green and blue triple, and consider static time-independent light-field data only, thus reducing the dimensionality of the light-field function to five dimensions and three color components. Modeling the light-field thus requires processing and storing a 5D function whose support is the set of all rays in 3D Cartesian space. However, light field models in computer graphics usually restrict the support of the light-field function to four-dimensional (4D) oriented line space. Two types of 4D light-field representations have been proposed, those based on planar parameterizations and those based on spherical, or isotropic, parameterizations.

The light-field representations based on planar parameterizations were inspired by classic computer graphics planar projections and by traditional two-step holography. For example, the two-plane parameterization (2PP) represents each oriented line in the 4D oriented line space by its intersection points with two ordered planes, a front plane (s, t) and a back plane (u, v), as illustrated in FIG. 1. The front and back planes together form a "light slab." FIG. 1 illustrates the 2D analogy of the geometry involved in rendering a 2PP-based light-field representation. C is the center of projection, S is a spherical projection surface, $dA_S$ is a differential area on S, P is the projection plane, $dA_P$ is a differential area on P, D is the distance between C and the front plane of parameterization, $\beta$ is the angle at which the differential pencil dl intersects that plane, and d is the (constant) orthogonal distance between the two planes.

Rendering algorithms to generate and build 2PP-based light fields have been proposed in the context of computer-generated holography and particularly holographic stereogramns, including the work described in the aforementioned paper by Levoy and Hanrahan. Holographic stereograms are discrete computer-generated holograms that optically store light-field discretetization via optical interference patterns recorded in a holographic recording material.

The choice of 2PP parameterization is primarily inspired by traditional two-step holography. The choice also simplifies rendering by avoiding the use of cylindrical and spherical projections during the light-field reconstruction process However, 2PP does not provide a uniform sampling of 3D line space. Moreover, even those 2PP models that rely on uniform samplings of the planes are known to introduce biases in the line sampling densities of the light field. Those biases are intrinsic to the parameterization and cannot be eliminated by increasing the number of slabs or changing the planes relative positions and orientations. Additionally, algorithms designed to enhance the speed with which computer graphics rendering is performed in the 2PP context, such as the algorithms described in M. Halle and A. Kropp, "Fast Computer Graphics Rendering for Full Parallax Spatial Displays," *Practical Holography XI, Proc.* SPIE, vol. 3011, pages 105–112, Feb. 10–11, 1997, which is hereby incorporated by reference herein in its entirety, often introduce additional (and undesirable) rendering artifacts and are susceptible to problems associated with anti-aliasing.

Accordingly, it is desirable to use light-field rendering techniques in hologram production while reducing or eliminating some or all of the problems associated with light-field rendering using 2PP light fields.

SUMMARY OF THE INVENTION

It has been discovered that using an isotropic, direction and point parameterization (DPP) light-field model for rendering can provide advantages in hologram production including reduced image artifacts, reduced oversampling, decreased rendering time, and decreased data storage requirements.

Accordingly, one aspect of the present invention provides a computer-implemented method of generating data for producing a hologram. A computer graphics model of a scene is provided. A first set of light-field data and a second set of light-field data are generated from the computer graphics model of a scene using an isotropic parameterization of a light field. Data from the first set of light-field data and the second set of light-field data are combined to produce at least one hogel image.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

FIGS. 3A–3B illustrate different light-field models.

FIG. 4 illustrates a hologram production system using a DPP light-field model.

DETAILED DESCRIPTION

The following sets forth a detailed description of at least the best contemplated mode for carrying out the one or more devices and/or processes described herein. The description is intended to be illustrative and should not be taken to be limiting.

The aforementioned U.S. Provisional Application Ser. No. 60/175,475 analyzes the sampling biases associated with both planar and spherical (isotropic) light-field parameterizations, and concludes that continuous 4D light-field representations require certain correction factors during the image registration process. The absence of those corrections during the light-field's discretization introduces biases in the representation that lead to rendering artifacts and over- and undersampling. Isotropic models, and particularly direction-and-point parameterizations (DPP) introduce less sampling bias than planar parameterizations, thereby leading to a greater uniformity of sample densities.

Figure 1:
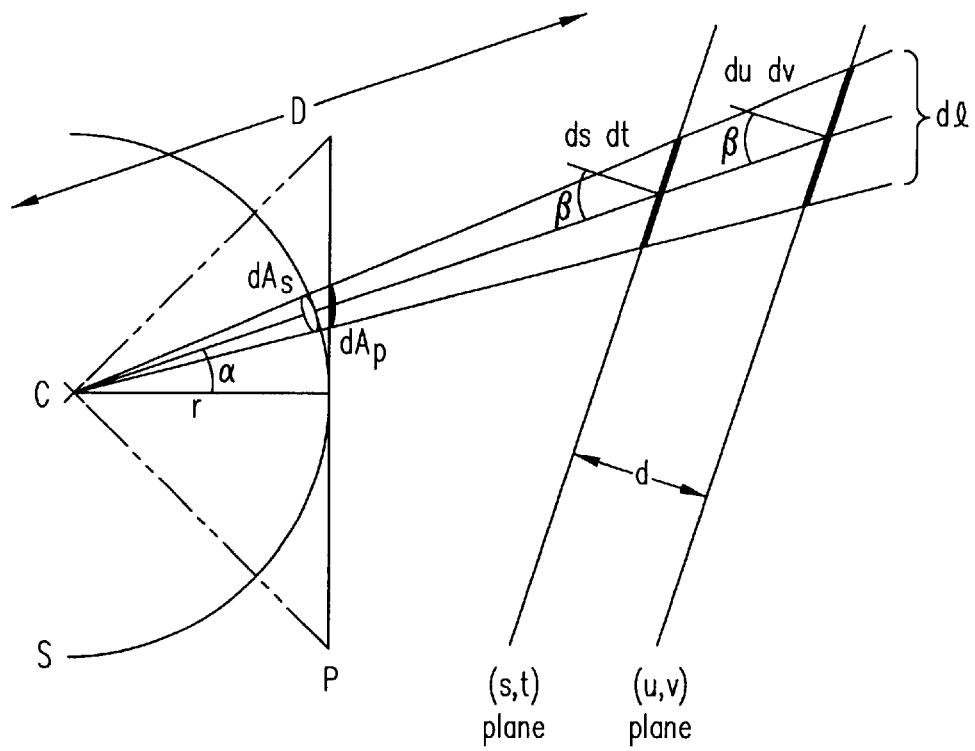
FIG. 1 illustrates the 2D analogy of the geometry involved in rendering a 2PP-based light-field representation.
Figure 2:
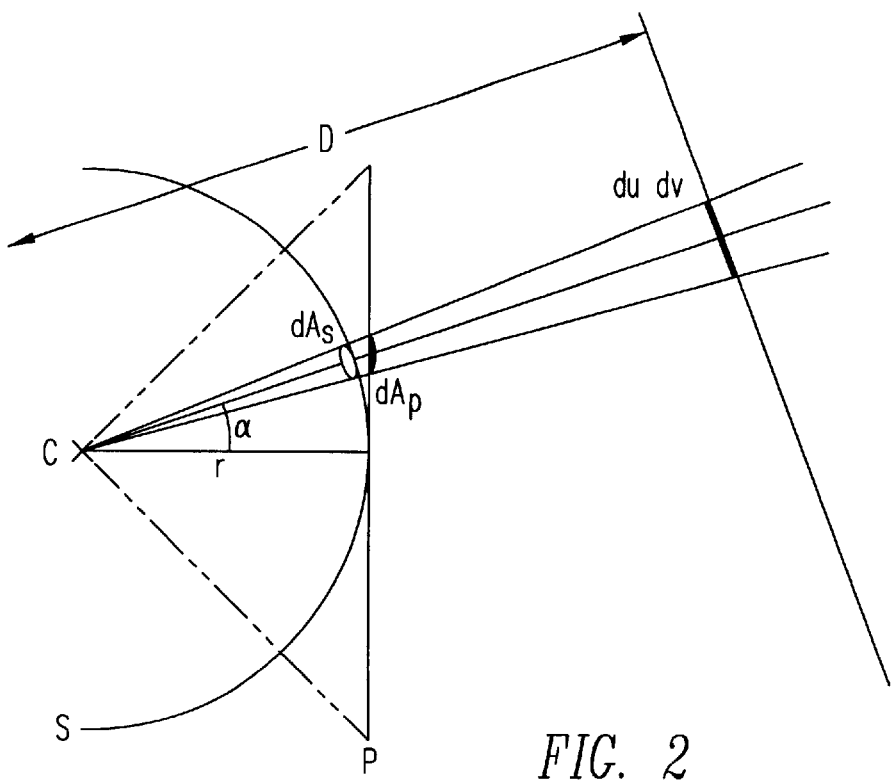
FIG. 2 illustrates the 2D analogy of the geometry involved in rendering a DPP-based light-field representation.

As previously noted, the light-field parameterization schemes considered are concerned with the representation of the support of the 4D light-field function. The support is the set of oriented lines in 3D (cartesian), a 4D space. The goal is a line parameterization such that uniform samplings of the parameters result in uniform sampling of lines. The DPP parameterizes an oriented line by its direction and its intersection with a plane orthogonal to the line. FIG. 2 illustrates the 2D analogy of the geometry involved in rendering a DPP-based light-field representation. C is the center of projection, S is a spherical projection surface, $dA_S$ is a differential area on S, P is the projection plane, $dA_P$ is a differential area on P, D is the distance between C and the front plane of parameterization. Thus, the order of parameterization, and consequently, the order in which light-field data is stored and accessed, is to first determine the direction of the 4D line (using, for example azimuth and elevation angles $(\theta, \phi)$) and then placing the line in 3D space by intersecting it with a plane orthogonal to its direction.

In general, DPP representations are advantageous because they require fewer correction factors than other representations, and thus their parameterization introduces fewer biases in the rendering process. As will be seen below, DPP representations provide additional advantages when used in the context of hologram production.

One-step and two-step holograms (including holographic stereograms) are well known to those having ordinary skill in the art. One-step holograms are created using a direct method, which records light-field data directly onto the master holographic plate. In some one-step systems, computer processed images of objects or computer models of objects allow the respective system to build a hologram from a number of contiguous, small, elemental pieces known as elemental holograms or hogels. To record each hogel on holographic recording material, an object beam is conditioned through the rendered image and interfered with by a reference beam. Examples of techniques for one-step hologram production can be found in the U.S. Patent Application entitled "Method arid Apparatus for Recording One-Step, Full-Color, Full-Parallax, Holographic Stereograms," U.S. Ser. No. 09/098,581, now U.S. Pat. No. 6,330,088, naming Michael A. Klug, Mark E. Holzbach, and Alejandro J. Ferdman as inventors, and filed on Jun. 17, 1998, which is hereby incorporated by reference herein in its entirety. Two-step holograms are created using indirect or transfer methods, that require recording a transfer hologram before printing the master hologram.

Traditional one-step and two-step holograms use 2PP-based light-field representations. For example, one-step holograms, such as those produced in the aforementioned U.S. patent application Ser. No. 09/098,581, use a modified 2PP representation with separate control of the positional and directional parameters. This is illustrated in FIG. 3A. In front of each hogel 300, a front window rectangular grid 310 is defined. Each of the grid elements 320 have the same size, resolution, and distance from the hologram plane 330. Each of the grid elements 320 defines a directional sample looking into the hologram. Although such a representation has its advantages, it is not without its disadvantages. Note that in the modified 2PP case, directional sampling is finer as the viewer looks at the hologram along glancing directions. This is inappropriate since viewers are more likely to look at a hologram along directions normal (or at least closer to normal) to the hologram's image plane. Additionally, the spatial sampling is also finer at glancing directions as hogels have smaller projected areas, leading to oversampling of the light-field in areas where samples are needed the least.

The DPP model illustrated in FIG. 3B reduces or eliminates these disadvantages. Uniform directional sampling is performed over front window spherical section 350. Front window spherical section 350 is divided into grid elements 360 have the same size and resolution, but now the area of spatial samples is kept constant, regardless of direction of view. In general, a variety of different window spherical sections can be used, however a spherical rectangle taken from the surface of a sphere is the most common. Moreover, if the image planes of the hologram are orthogonal to the directional samples, the number of spatial samples required to represent the projected surface of the hologram decreases as the viewing angle increases. However, no changes in spatial resolution are visible as the viewer moves around the hologram, because the viewer always sees the same spatial resolution. Additionally, light-field data in the DPP representation requires less storage (some experiments yield a 45% storage savings) because of the more compact spherical functions.

FIG. 4 illustrates hologram production system 400 using the DPP light-field model. In contrast to the production systems disclosed in the aforementioned U.S. patent application Ser. No. 09/098,581 (which are often referred to as "on-line" production systems because the hogel images to be recorded in the holographic recording material are rendered, used, and discarded has the hologram is being printed) the hologram production in FIG. 4 is often referred to as "off-line" production. This is because the light-field images (data) are first rendered and stored, and then processed into hogel images. Nevertheless, there are many common aspects between on-line and off-line systems. In general, a hologram is printed by recording interference patterns in a light sensitive holographic recording material. A simple method exposes the material with coherent laser light generated by a red, a green and a blue laser. The laser beams are combined into two sets, the object beam(s) and the reference beam(s), both containing all three color components. The object beams are then modulated in amplitude using a spatial light modulator, typically an LCD screen or a digital micromirror array, using the rendered images. The modulated object beam is then combined with the reference beam in the recording material to record a single hogel's interference pattern.

Using a DPP model typically reduces the overall rendering time, as compared to the modified 2PP model (some experiments show rendering time savings in excess of 50%). It also de-couples the rendering process from the printing process, thereby allowing higher-quality (but slower to produce) rendered images. All of this is in addition to the reduction or elimination of certain rendering artifacts associated with other light-field models.

Hologram production begins with 3D computer graphics model 410. A 3D graphics model is first composed using standard 3D graphics tools (e.g. a 3D modeling too such as 3D Studio Max) and techniques. A conversion program is then used to convert the model into a format enhanced to support the definition and adjustment of multiple hologram parameters 420, including, for example, hologram size, hogel size, resolution, field of view, position of hologram illuminating light source, position and orientation of the hologram, and position and orientation model front window.

Next, light field images (data) are generated (430) using parallel oblique projections, one per discrete direction printed by the hologram printer. This is in contrast to on-line schemes using other light-field models where the image for an entire hogel (i.e. using all discrete directions printed by the hologram printer) is rendered at once. Rendering all of the projections in one discrete direction for all of the hogels in, for example, a tile of hogels, efficiently makes use of the DPP parameterization. Note that the projection plane and the rendering window typically match the hologram's gezometry. The rendered light-field image is saved in storage 440, which, like storage 460 below, can be any type of suitable data storage device, including magnetic, electronic, and optical storage devices. A light-field like structure using a DPP-like representation is used to store the data, where the directional samples are given by the geometry of the hologram in the printer, i.e., the projection plane and the rendering window match the hologram's geometry. The process is repeated for each discrete direction printed by the hologram printer. Where the spatial light modulator used for printing is a 1024 pixel by 1280 pixel LCD display, the line connecting the center of a pixel with the center of a hogel defines one discrete direction.

Once the light-field data for all directions is rendered, the data is reparameterized 450. Because the light-field data is not organized by hogel, the relevant data for each hogel must be extracted from each of the rendered light-field images. This process is also referred to as "slicing and dicing" the light-field image data. As illustrated, the newly created hogel images are stored in storage 460, for later use by a printing system. Alternatively, the extracted hologram images can be directed to the printing system without an intermediate storage step.

In general, any computer graphics rendering technique can be used in conjunction with the DPP representation as described herein. Thus, rendering 430 can be implemented using scan-conversion or scan-line conversion (e.g., as implemented in the OpenGL™ graphics library), ray tracing techniques, and even image-based rendering techniques (e.g., as discussed aforementioned paper by Levoy and Hanrahan). Moreover, rendering hardware and/or software may become sufficiently fast and storage-dense in the future so as to obviate the need for storage 440 and/or storage 460.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A computer-implemented method of generating data for producing a hologram comprising:

providing a computer graphics model of a scene;

generating a first set of light-field data and a second set of light-field data from the computer graphics model of a scene using an isotropic parameterization of a light field;

combining data from the first set of light-field data and the second set of light-field data to produce at least one hogel image.

2. The computer-implemented method of claim 1 wherein the computer graphics model is a three dimensional (3D) computer graphics model.

3. The computer-implemented method of claim 1 wherein the generating further comprises one of scan-line conversion, ray tracing, and image-based rendering.

4. The computer-implemented method of claim 1 further comprising:

defining a first plurality of sampling directions associated with a first hogel image;

defining a second plurality of sampling directions associated with a second hogel image; and wherein the generating a first set of light-field data further comprises generating a first plurality of parallel oblique projections using at least one of the first plurality of sampling directions and at least one of the second plurality of sampling directions; and wherein the generating a second set of light-field data further comprises generating a second plurality of parallel oblique projections using at least one of the first plurality of sampling directions and at least one of the second plurality of sampling directions.

5. The computer-implemented method of claim 1 further comprising:

defining a plurality of sampling directions associated with the at least one hogel image; and uniformly sampling the plurality of sampling directions.

6. The computer-implemented method of claim 1 wherein the isotropic parameterization of a light field is a direction-and-point parameterization (DPP) of a light field.

7. The computer-implemented method of claim 1 further comprising:

storing at least one of the first set of light-field data, the second set of light-field data, and the at least one hogel image on at least one storage medium.

8. The computer-implemented method of claim 7 wherein the at least one storage medium is one of a magnetic storage medium, an electronic storage medium, and an optical storage medium.

9. The computer-implemented method of claim 7 wherein at least one of the first set of light-field data, the second set of light-field data is stored in a DPP format.

10. The computer-implemented method of claim 1 further comprising:

providing at least one hologram parameter.

11. The computer-implemented method of claim 10 wherein the at least one hologram parameter is at least one of a hologram size, a hogel size, a resolution, a field of view, and a position of a hologram illuminating light source.

* * * * *